United States Patent

[11] 3,628,703

[72] Inventor Katsuhiko Wakamatsu
5-go, 10-ban, 2-chome, Momoi, Suginam-ku, Tokyo-to, Japan
[21] Appl. No. 868,074
[22] Filed Oct. 21, 1969
[45] Patented Dec. 21, 1971
[32] Priority Nov. 25, 1968
[33] Japan
[31] 43/85623

[54] DISPENSING CONTAINER
2 Claims, 5 Drawing Figs.

[52] U.S. Cl. .................................................. 222/454, 222/457
[51] Int. Cl. .................................................. G01f 11/26
[50] Field of Search ........................................... 222/454, 455, 456, 457, 457.5

[56] References Cited
UNITED STATES PATENTS
| | | | |
|---|---|---|---|
| 2,127,417 | 8/1938 | Nelsen............................ | 222/455 |
| 3,090,532 | 5/1963 | Robson ......................... | 222/456 |
| 3,235,143 | 2/1966 | Goodrich ....................... | 222/454 |

FOREIGN PATENTS
| | | | |
|---|---|---|---|
| 53,280 | 0/0000 | Switzerland.................. | 222/454 |

Primary Examiner—Robert B. Reeves
Assistant Examiner—Frederick R. Handren
Attorney—Ernest G. Montague ABSTRACT: There is described a dispensing container particularly suitable for powdery, granular or the like materials, whereby a predetermined amount of the content material may be dispensed at every one tilting operation of the container, such container being provided on top of the body thereof with a chamber adapted to control the amount of the content material to be dispensed.

PATENTED DEC 21 1971 3,628,703

INVENTOR.
Katsuhiko Wakamatsu
BY Ernest G. Montague
attorney

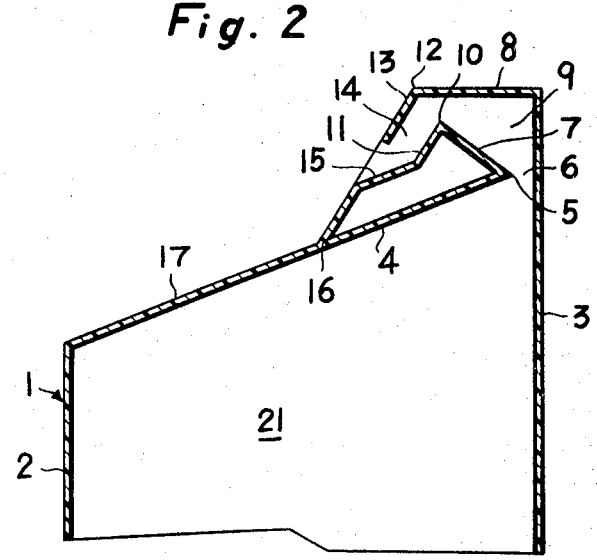
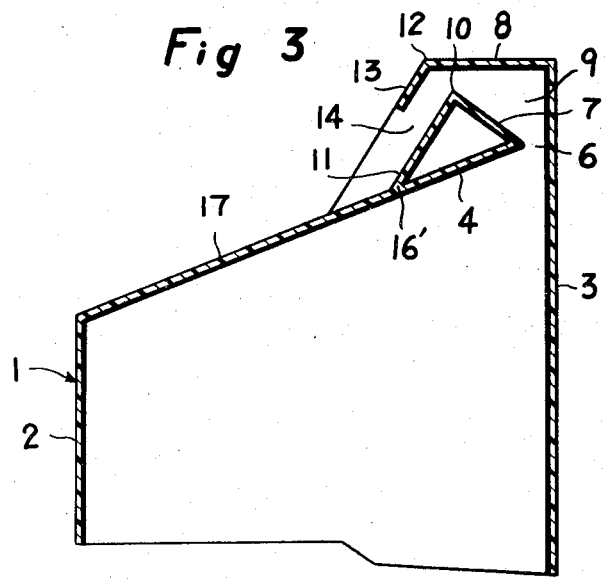

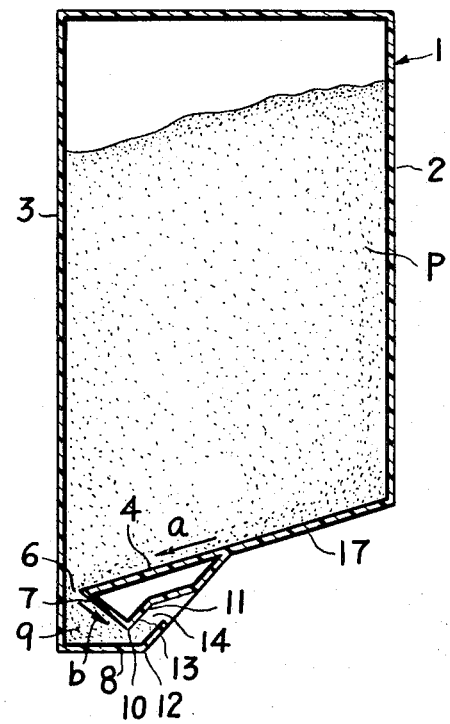
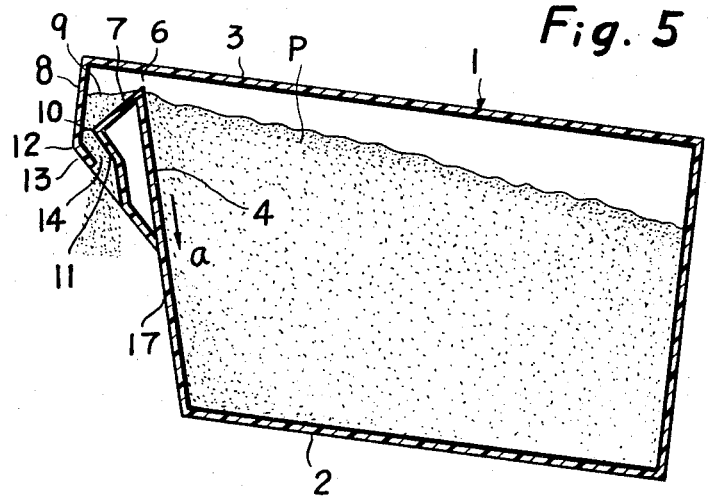

DISPENSING CONTAINER

This invention relates to a dispensing container, and more particularly to a dispensing container suitable for powdery or granular materials.

It is the primary object of the the present invention to provide a dispensing container for powdery, granular or the like materials with provision for measuring the quantity of the content material to be dispensed.

It is another object of the present invention to provide a dispensing container of the type described, whereby the content material may be dispensed in a predetermined quantity only by one tilting operation of the container.

It is another object of the present invention to provide a dispensing container of the type described, and which container is simple in construction and easy to handle.

The essential feature of the container according to the instant invention resides is that a predetermined amount of the content material may be dispensed without resort to a hand or spoon or any other measuring instrument and, therefore, in that the content material may be handled quite hygienically without any fear of the material being spoiled while it is dispensed.

According to the present invention, there is provided a dispensing container comprising a pair of opposingly spaced sidewalls each having integrally formed therewith a riser portion forming a longer side of the sidewalls, a short end wall connecting the shorter side of said sidewalls, a long end wall connecting the longer side of said sidewalls, a lower top wall connecting the upper ends of said sidewalls and extending gradually upward toward said long end wall, said lower top wall terminating short of said long end wall to provide therebetween a spacing for discharge therethrough of the material held within the container cavity, and upper top wall connecting the upper ends of said riser portions and having a bent portion in the end portion which is disposed opposite to said long end wall, a ridge member arranged on said lower top wall adjacent to said spacing and having an inner sloping and an outer sloping surface, said inner sloping surface in cooperation with said riser portions, upper top wall and long end wall defining a substantially enclosed space adapted as a chamber for measuring and controlling the amount of the material to be dispensed through said spacing. The foregoing and other objects and additional features of the present invention will be more fully understood from the following description and appended claims, reference being had to the accompanying drawings forming a part of this specification wherein like numerals designate like or corresponding parts throughout the various figures.

In the accompanying drawings:

FIG. 2 is a fragmentary sectional view of the dispensing container in FIG. 1;

FIG. 3 is a fragmentary sectional view of a modified structure; and

FIGS. 4 and 5 are schematic views explanatory of the manner in which the container is used.

Figure 1:
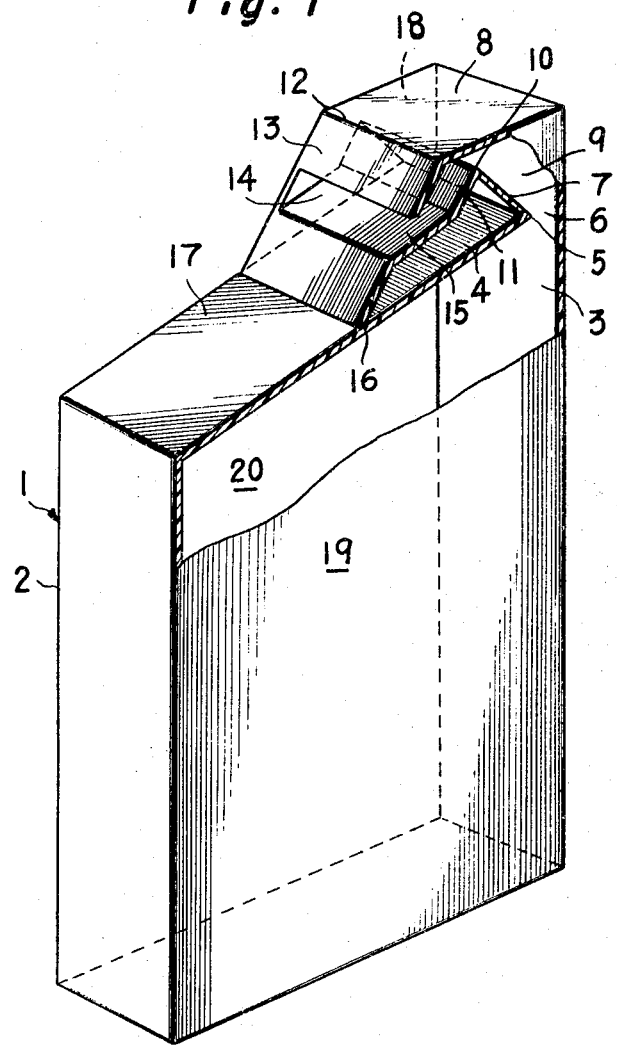
FIG. 1 is a partially sectioned perspective view of dispensing container according to my invention.

Referring to the accompanying drawings, and first to FIGS. 1 and 2, the dispensing container of my invention is indicated in general by the reference numeral 1 and includes a pair of opposingly spaced sidewalls 19 and 20. Each of the sidewalls 19 and 20 has formed integrally therewith a riser portion 18 adjacent one of the upper end corners thereof, the riser portion forming a longer side of the container. On this side, the sidewalls 19 and 20 are connected by a long end wall 3, and on the shorter side by a short end wall 2. The upper ends of these sidewalls are connected by a lower top having an extension 4 extending progressively upward toward the long end wall 3. This extension 4 of the lower top wall terminates short of the long end wall 3 to form therebetween a spacing for discharge therethrough of the material "P" held within the cavity of the container 1. The upper ends of the riser portions 18 are connected by an upper top wall 8 which has bent portion 13 folded along the line 12 in the end portion thereof which is disposed opposite to said long end wall 3. Arranged on the end portion of the extension 4 adjacent said spacing 6 is a ridge member of angular cross section having on opposite sides of its angular projection on ridge 10 a first or inner sloping surface 7 and a second or outer sloping surface 11. The first or inner sloping surface 7, in cooperation with the upper top wall 8, the long end walls 3 and the riser portions 18, defines a substantially enclosed space 9 which may be termed a "measuring chamber" for measuring and controlling the amount of the material P to be dispensed through said spacing 6 by one tilting or turning operation of the container 1.

The second or outer sloping surface 11 of the ridge member together with the bent portion 13 of the upper top wall 8 forms a passage 14 for passage therethrough of the material P outcoming from the measuring chamber 9 over the ridge 10 formed by the first and second sloping surface 7 and 11.

In the preferred embodiment shown in FIGS. 1 and 2, the ridge member further has contiguously connected to the outer sloping surface 11 a horizontal wall means or plateau 15 adjoining at the outer end thereof with another sloping surface which is secured to the lower top wall as shown at 16. FIGS. 1 and 2 show the lower top wall 17 formed integrally and disposed at the same gradient with the extension 4. However, the lower top wall 17 may be arranged horizontally with only the extension 4 disposed upwardly toward the spacing 6, and the extension 4 may be formed separately from the top wall 17 and be connected thereto later. Such arrangements will be clearly and readily understood, though not illustrated in the accompanying drawings.

FIG. 3 shows a modified structure of the dispensing container of my invention, wherein the horizontal wall or plateau 15 of the ridge member is omitted and the lower end of the second sloping surface 11 is directly secured to the lower top wall 17. In any case, it is preferred to provide an inlet in either of the sidewalls 19 and 20 or in the bottom wall of the container for filling up the container cavity with the material to be held therein.

With such construction, when the container 1 is turned into the inverted position of FIG. 4, the content material P flows along the sloping extension 4 of the lower top wall 17 as indicated by the arrow "$a$" and then into the measuring chamber 9 as indicated by the arrow "$b$."

When the container 1 is brought into the inverted position of FIG. 4, the passage 14 temporarily opens sideways and downward. Therefore, an idea may be occurred to that the content material P would spontaneously get out of the passage 14. However, during this event the sloping extension 4 of the lower top wall 17 is disposed horizontally or disposed with its end on the side of the short end wall 2 lower than the opposite end which is connected to the inner sloping surface 7 of the ridge member, so that the content material P does not tend to flow into the measuring chamber 9. It is only when and after the lower top wall 17 or the extension 4 has been turned from the horizontal position to the titled position of FIG. 4 that the content material P begins to flow into the measuring chamber 9. During this event, the passage 14 opens upward or obliquely upward as seen particularly in FIG. 4, so that the content material P would not flow out of the passage 14. It will be appreciated that while the content material P is flowing into the measuring chamber 9 through the spacing or outlet 6, the adjacent walls of the container function as a funnel, thus expediting the delivery into the chamber 9 of the content material P.

Now the movement of the content material P will be explained in more detail. The weight of the content material P in the measuring chamber 9 is imposed mainly upon the upper top wall 8 and little is imposed upon the sidewalls of the chamber 9. Therefore, the material P would not fly out of the chamber 9 unless the container is violently handled. That portion of the material P which has come out of the measuring chamber 9 over the angular projection or ridge 10 of the ridge member is held there at by gravity or otherwise blocked by the bent portion 13 of the upper top wall 8, and such blocked portion of the material P prevents further entry into the chamber 9 of the content material P in the container cavity. Thence, the content material P ceases flowing and becomes static.

Therefore, if the container 1 is further turned from the position of FIG. 4 to that of FIG. 5, the material in the measuring chamber 9 falls down by gravity out of the chamber along the funnellike passage formed by the sloping surfaces 7 and 11 of the ridge member and the upper top wall 8.

Simultaneously with the outflow of the content material P as explained in the foregoing paragraph, the material P which is located in the vicinity of the entrance of the measuring chamber 9 or the outlet 6 of the container 1 is caused to escape away from the edge 5 of the entrance on both sides thereof, and the content material P within the container cavity retracts along the sloping extension 4 of the lower top wall 17 in the direction indicated by the arrow $a'$ in FIG. 5, without allowing the material in the chamber to flow back into the container or the material in the container to further flow into the chamber 9. This makes the quantity of the material to be introduced into and discharged out of the chamber 9 always fixed.

It should be noted that the gradient of the extension 4 or of the inner surface 7 of the ridge member is determined depending upon the characteristics of the material to be utilized, i.e. the size and weight of the particles of the powdery or granular material. The volume of the measuring chamber 9 equals to and depends upon that of the content material required to be dispensed by one tilting operation of the container.

It will be apparent from the foregoing that the dispensing container according to the present invention can be advantageously used for dispensing in a predetermined amount powdery, granular or any other similar material, including not only finely powdered stuffs such as coffee, powdered milk, sugar and relish or additives which require to be dispensed in a fixed amount but also materials of relatively large particles such as cleanser or the like. It will also be appreciated that according to the present invention the content material can be dispensed by only one tilting operation of the container, thus rendering the dispensing operation easy and hygienic.

While I have shown in the foregoing description specific and preferred embodiments of my invention, it will be understood that various modification within the spirit of the invention may occur to those skilled in the art. Therefore, it is intended that no limitation by placed on the invention except as defined in the appended claims.

What is claimed is:

1. A dispensing container of the type described, comprising a pair of opposingly spaced sidewalls each having integrally formed therewith a riser portion forming a longer side of the container, a short end wall connecting the shorter side of the sidewalls, a long end wall connecting the longer side of the sidewalls, a lower tope wall connecting the upper ends of said sidewalls and extending gradually upward toward said long end wall, said lower top wall terminating short of said long end wall to provide therebetween a spacing for discharge therethrough of the material held within the container cavity, an upper top wall connecting the upper ends of said riser portions and having a bent portion in the end portion thereof which is disposed opposite to said long end wall, a ridge member arranged on said lower top wall adjacent to said spacing and having an inner sloping surface and an outer sloping surface, said inner sloping surface in cooperation with said riser portions, upper top wall and long end wall defining a substantially enclosed space adapted for measuring and controlling the amount of the material to be dispensed through the spacing.

2. A dispensing container as defined in claim 1, wherein said ridge member further includes contiguously connected to said outer sloping surface a horizontal wall section which is connected to the lower top wall by way of a sloping wall surface.

* * * * *